United States Patent
Da Palma et al.

(10) Patent No.: US 8,074,202 B2
(45) Date of Patent: Dec. 6, 2011

(54) WIKI APPLICATION DEVELOPMENT TOOL THAT USES SPECIALIZED BLOGS TO PUBLISH WIKI DEVELOPMENT CONTENT IN AN ORGANIZED/SEARCHABLE FASHION

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 11/766,291

(22) Filed: Jun. 21, 2007

(65) Prior Publication Data
US 2008/0320443 A1   Dec. 25, 2008

Related U.S. Application Data

(63) Continuation-in-part of application No. 11/765,900, filed on Jun. 20, 2007, which is a continuation-in-part of application No. 11/765,928, filed on Jun. 20, 2007, which is a continuation-in-part of application No. 11/765,962, filed on Jun. 20, 2007.

(51) Int. Cl.
*G06F 9/44* (2006.01)
(52) U.S. Cl. .................... 717/110; 717/270; 707/713
(58) Field of Classification Search .............. 717/110, 717/270; 707/713
See application file for complete search history.

(56) References Cited

U.S. PATENT DOCUMENTS

| 6,314,402 B1 | 11/2001 | Monaco et al. |
| 6,324,511 B1 | 11/2001 | Kiraly et al. |
| 6,442,577 B1 | 8/2002 | Britton et al. |
| 6,636,831 B1 | 10/2003 | Profit, Jr. et al. |

(Continued)

FOREIGN PATENT DOCUMENTS
WO   2005011921   12/2005

OTHER PUBLICATIONS

Joshua D. O'Sullivan, "A Concept of Operations for the Use of Emergent Open Internet Technologies As the Basis for a Network-Centric Environment", Sep. 2006.*

(Continued)

*Primary Examiner* — Wei Zhen
*Assistant Examiner* — Phillip Nguyen
(74) *Attorney, Agent, or Firm* — Patents on Demand, P.A.; Brian K. Buchheit; Scott M. Garrett

(57) ABSTRACT

The present invention discloses a software development system for WIKIs including a WIKI server, a BLOG server, and a data store. The WIKI server can serve WIKI pages to WIKI clients. The BLOG server can serve BLOGs to BLOG clients. The data store can manage WIKI BLOG entries. Each WIKI BLOG entry can include a link to one of the WIKI pages and metadata for the linked WIKI page. The metadata can include a WIKI page title, a WIKI page version, a WIKI page description, design notes, and other information. Searchable keywords can be generated from the metadata. WIKI BLOG entries can be searched by WIKI developers to find WIKI pages having designer specified criteria based on a keyword search. Wherein searching for WIKI BLOG entries and editing discovered WIKI pages associated with WIKI BLOGs can be performed by a WIKI client via a WIKI interface.

19 Claims, 4 Drawing Sheets

U.S. PATENT DOCUMENTS

| | | | |
|---|---|---|---|
| 6,801,604 | B2 | 10/2004 | Maes et al. |
| 6,865,599 | B2 | 3/2005 | Zhang |
| 7,143,148 | B1 | 11/2006 | Hickman et al. |
| 7,334,050 | B2 | 2/2008 | Zondervan et al. |
| 7,433,876 | B2 * | 10/2008 | Spivack et al. ............... 1/1 |
| 7,581,166 | B2 | 8/2009 | Renger et al. |
| 7,584,268 | B2 * | 9/2009 | Kraus et al. ............... 709/218 |
| 7,631,104 | B2 | 12/2009 | Da Palma et al. |
| 7,673,017 | B2 | 3/2010 | Kim et al. |
| 7,860,946 | B1 * | 12/2010 | Bulleit et al. ............... 709/218 |
| 2002/0010756 | A1 | 1/2002 | Oku |
| 2002/0052747 | A1 | 5/2002 | Sarukkai |
| 2003/0055884 | A1 | 3/2003 | Yuen et al. |
| 2003/0088421 | A1 | 5/2003 | Maes et al. |
| 2003/0139928 | A1 | 7/2003 | Krupatkin et al. |
| 2003/0177010 | A1 | 9/2003 | Locke |
| 2005/0132056 | A1 | 6/2005 | Creamer et al. |
| 2006/0004703 | A1 | 1/2006 | Spivack et al. |
| 2006/0015335 | A1 | 1/2006 | Vennelakanti et al. |
| 2006/0195328 | A1 | 8/2006 | Abraham et al. |
| 2007/0078884 | A1 | 4/2007 | Ott et al. |
| 2008/0086689 | A1 | 4/2008 | Berkley et al. |
| 2008/0242221 | A1 | 10/2008 | Shapiro et al. |
| 2008/0319742 | A1 | 12/2008 | Da Palma et al. |
| 2008/0319757 | A1 | 12/2008 | Da Palma et al. |
| 2008/0319758 | A1 | 12/2008 | Da Palma et al. |
| 2008/0319759 | A1 | 12/2008 | Da Palma et al. |
| 2008/0319760 | A1 | 12/2008 | Da Palma et al. |
| 2008/0319761 | A1 | 12/2008 | Da Palma et al. |
| 2008/0319762 | A1 | 12/2008 | Da Palma et al. |
| 2008/0320079 | A1 | 12/2008 | Da Palma et al. |

OTHER PUBLICATIONS

Ying Wu, "The Use of Web Publishing Technologies in Environmental NGOs—Blog, RSS/Atom and Wiki", Feb. 2, 2006.*
Patrick Patterson, "A Look at the use and Creation of RSS/Atom Feeds", Dec. 9, 2005.*
Jones et al., "Academic Collaboration Environment", May 2006.*
"BLIKI", Wikipedia, viewed Feb. 23, 2007.
"Enterprise Bliki", Wikipedia, viewed Feb. 23, 2007.
"Cyn.in", Cyn.in, viewed Feb. 23, 2007.
"Wiki", Wikipedia, viewed Feb. 23, 2007.
"SuiteTwo: Features", Moveable Type, viewed Feb. 23, 2007.
Freier, J., et al., "WebViews: Accessing Personalized Web Content and Services", Proc. of 10th Int'l Conf. on WWW, Hong Kong, pp. 576-586, 2001.
Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.
Capra III, R.G., et al., "Mobile refinding of web information using a voice interface: an exploratory study", Proc. of 2005 Latin American Conf. on Human-computer interaction, Cuernavaca, Mexico, pp. 88-99, 2005.
Huang, C.M., et al., "Phone-Web: Accessing WWW using a telephone set", World Wide Web, vol. 2, No. 3, pp. 161-178, 1999.
Fielding, R., et al., "Principled Design of the Modern Web Architecture," ACM Trans. on Internet Technology, vol. 2, No. 2, May 2002, pp. 115-150.
Kolias, et al., "A Pervasive Wiki Application Based on VoiceXML," ACM, PETRA '08, Jul. 15-19, 2008.
Chang, S.E., et al., "The implementation of a secure and pervasive multimodal Web system architecture", Inf. and Software Tech., vol. 48, No. 6, pp. 424-432, Jun. 2006.
Nottingham, M., et al., "Request for Comments (RFC) 4287: The Atom Syndication Format," The Internet Society, Dec. 2005, 43 pages.
Schaffert, et al., "IkeWiki: A Semantic Wiki for Collaborative Knowledge Management,"IEEE Int'l. Workshops on Enabling Technologies: Infrastructure for Collaborative Enterprises, 2006.
DeMaria, M.J., "Searching for the Right Words", Network Computing, vol. 17, No. 22, pp. 26, 28, Oct. 26, 2006.
Takami, et al., "A Study on the Architecture and Voice Dialog Scheme for a Personal Web Service in a Ubiquitous Communication Environment," IEEE, pp. 398-401, Jun. 2006.
Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.
US Patent No. 7631104, Notice of Allowance, Jul. 29, 2009.
US Pub. No. 20080319758, Office Action 1, Jun. 9, 2010.
US Pub. No. 20080319762, Office Action 1, Jun. 11, 2010.
US Pub. No. 20080319760, Office Action 1, Jul. 12, 2010.
US Pub. No. 20080320079, Office Action 1, Jun. 30, 2010.
Leseney, T., "Push-to-blog", Siemens AG, Oct. 2004.
Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.
O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.

* cited by examiner

WIKI APPLICATION DEVELOPMENT TOOL THAT USES SPECIALIZED BLOGS TO PUBLISH WIKI DEVELOPMENT CONTENT IN AN ORGANIZED/SEARCHABLE FASHION

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765, 928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of WIKI applications and, more particularly, to a WIKI application development tool that uses specialized BLOGs to publish WIKI developmental content in an organized/searchable fashion.

2. Description of the Related Art

A WIKI is a collaborative web application that allows end users to add and edit content. A WIKI application refers to a collection of WIKI pages written in a markup language that are interconnected via hyperlinks. WIKIs are served by a WIKI server to standard Web browsers which function as WIKI clients. A WIKI server can also serve a special Web page that is a WIKI editor where users add and edit content. Some WIKI sites permit WIKI content to be written in accordance with a WIKI syntax, such as having special characters to indicate hyperlinked content, bulleted content, and the like. WIKI syntax is generally designed to be more intuitive for end-users to utilize than standard markup languages.

Although WIKI pages are quickly and easily developed by relatively novice developers, conventional development techniques for WIKIs have many significant disadvantages. At present, WIKIs are developed in an ad-hoc, loosely coupled manner. Each WIKI page generally behaves in an autonomous fashion in accordance with internally defined standards. A WIKI application formed from multiple linked WIKI pages typically has a non-cohesive feel. In other words, unlike conventional applications that have many common and consistent components, such as common color schemes, common font sizes and types, common toolbars and toolbar icons, common pop-up windows, common hot-key combinations, and the like, a look and feel of a WIKI application can vary greatly from page to page. Further, a current lack of cohesion among WIKI pages makes it difficult to establish settings that affect an entire WIKI application. State information is generally not retained from page-to-page or session-to-session.

Additionally, WIKI syntax and WIKI editors are presently not standardized and WIKI implementation specifics can vary from one WIKI server to another. Thus, a WIKI developer creating a set of one or more linked WIKI pages for execution on one WIKI server may have to manually adjust or recreate the set of WIKI pages for execution on a different WIKI server.

Generally, software design principles used for most types of programming, such as modularization, software re-use, documenting code, documenting an application, and the like, have not been applied to WIKI applications. This lack of foundational structure has relegated WIKIs to small scale software efforts which can be quickly created by a single developer.

At present, no community/collaboration toolsets exist that facilitate integrated development efforts other than providing content to an otherwise static WIKI application. Tools do not exist to permit developers to collaborate on creating/modifying the WIKI application itself. Existing WIKI tools do not encourage developers to create re-usable code components, to share code components with others, or to utilize code components created by others. What is needed is a mechanism to facilitate sharing and re-use of WIKI application code, preferably in a fashion consistent with general Web 2.0 techniques and protocols.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
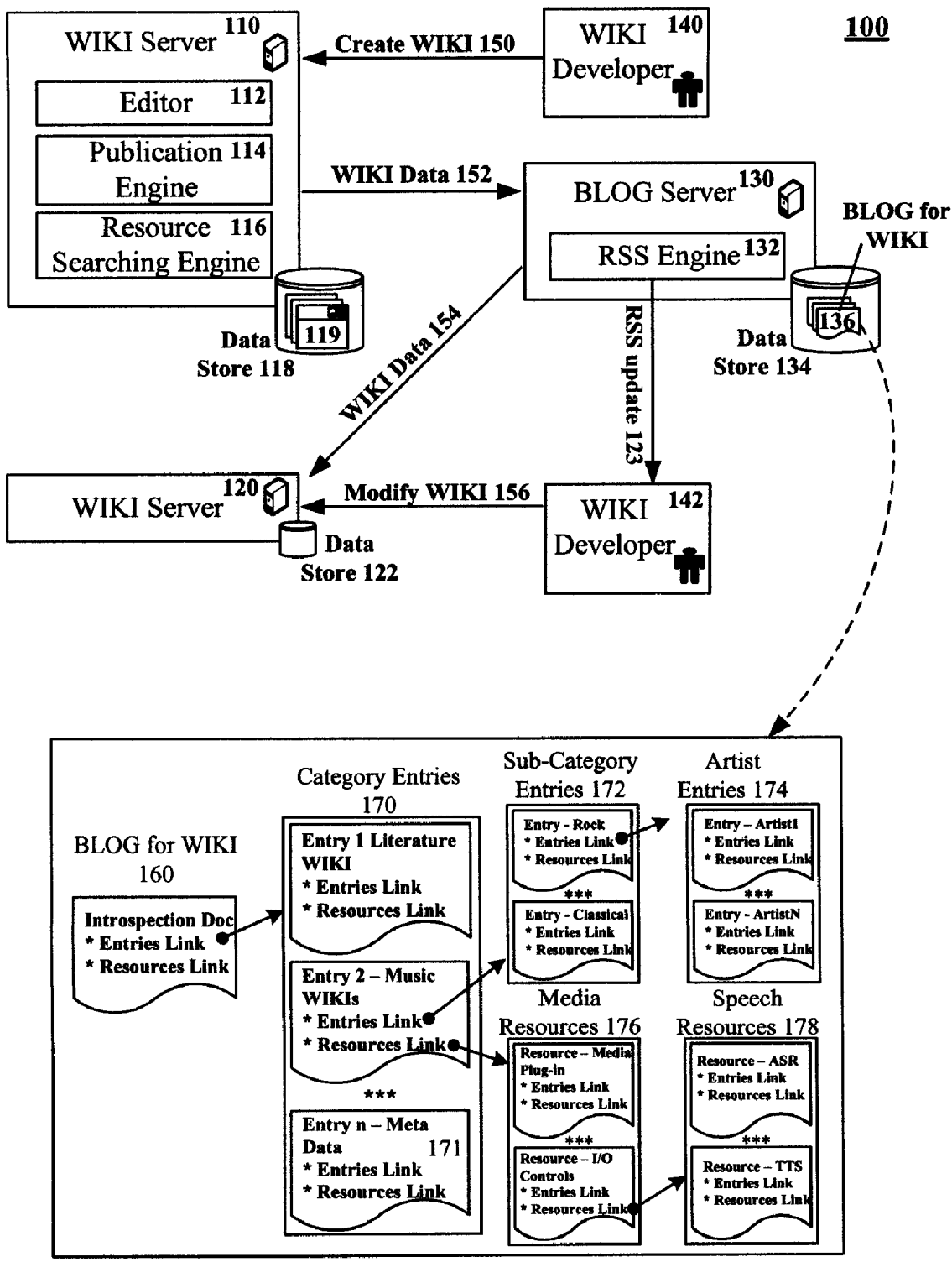
FIG. 1 is a schematic diagram of a system for establishing and using BLOGs for WIKI publication in accordance with an embodiment of the inventive arrangements disclosed herein.

FIG. 1 is a schematic diagram of a system 100 for establishing and using BLOGs for WIKI 136 publication in accordance with an embodiment of the inventive arrangements disclosed herein. A BLOG for WIKI 136 publication is a special BLOG that contains collections of WIKI applications and pages. Each entry in the BLOG for WIKI 136 publication can include a link to a WIKI page as well as metadata information pertaining to the WIKI page. The metadata information can include a page version, title, developer, summary, and other information. The metadata information of the BLOG for WIKI 136 publication can be indexed for keyword searching. The BLOG for WIKI 136 publication can be organized so that developers 140, 142 can add new content and search for pre-existing content matching desired criteria. Thus, the BLOG for WIKI 136 publication facilitates WIKI re-use and code sharing among a set of developers 140, 142.

More specifically, a WIKI developer 140 can utilize an editor 112 of a WIKI server 110 to create a WIKI 150. Upon creating the WIKI, the developer 140 will be provided an option to publish the WIKI content, which triggers a publication event. In one embodiment, the WIKI server 110 can automatically initiate the publication event upon WIKI creation or modification. The publication event causes a publication engine 114 to convey WIKI data 152 to the BLOG server 130, where it is ultimately processed to create a BLOG for WIKI publication 136 which is stored in data store 134. The newly created WIKI can be placed in data store 118, where it is served as a WIKI page 119 which may be linked to other pages 119 to create a WIKI application.

Other developers can specify criteria used by resource searching engine 116 to search the data store 134 for matching BLOG for WIKI 136 publications. These discovered publications can link the developer to a related WIKI page which can be edited by the developer. The developer can, for example, incorporate the discovered WIKI content into a new project, thus leveraging pre-existing software that should minimize the development time. In another example, the developer can customize a pre-existing WIKI so that it behaves in a user-desired manner. Thereafter the user and others preferring the customization can use the modified WIKI instead of the base WIKI.

In one embodiment, publishing WIKI data 152 to the BLOG server 130 can entail copying all the related files for the WIKI to an external data space, such as data store 134. A WIKI developer 142 can modify 156 the stored WIKI by first accessing a WIKI server 120. The WIKI server 120 can query the data store 134, can retrieve the stored WIKI data 154, and can store this data 154 in data store 122. The WIKI server 120, which is different from the original server 110, can publish the WIKI version that was modified by the developer 142.

Additionally, the BLOG server 130 can include a Rich Site Summary (RSS) engine 132, which establishes RSS feeds related to the BLOG for WIKI 136 publications. Developers 142 can subscribe to the RSS engine 132 and can receive update 123 notifications whenever changes are made to a corresponding WIKI page.

Unlike WIKIs, BLOGs are highly organized, often using the ATOM PUBLISHING PROTOCOL (APP) or other organized structure for storing and linking content. BLOG for WIKI publication 160 shows a exemplary structure for a sample BLOG for WIKI publication. The publication 160 is associated with a WIKI application that stored different categories of accessible content in a hierarchy. Categorized content can include category entries 170, such as literature and music. The music category can include subcategories 172 of rock, classical, and other types of music. Each type of music can be broken down into entries 174 for artist, album, song, and the like.

Each BLOG for WIKI item can include an introspection document, an entries link, and a resource link in accordance with the APP or other utilized protocol. Each entry can be associated with a WIKI application, page, or page element. A special type of entry can be a metadata entry 171, which provides metadata information concerning a parent item, such as version, title, summary, and the like. In another embodiment, the metadata can be associated with special markup tags, which can be introspected, and need not be implemented as a separate entry 171.

A set of resources can also be associated with each item of the BLOG for WIKI publication 160. Resources can contain media that is applicable at each level of the WIKI. In one embodiment, these resources can include speech resources used to speech-enable the associated WIKI. To illustrate, the music entry of category 170 links to media resources 176. These resources 176 include a media plug-in for playing music and a set of input/output (I/O) controls. The I/O controls are linked to speech processing resources 178, such as automatic speech recognition (ASR) resource and text-to-speech (TTS) resource. These resources 178 can be further configured, such as by specifying speech recognition grammars, a speech synthesis language, and the like.

Figure 2:
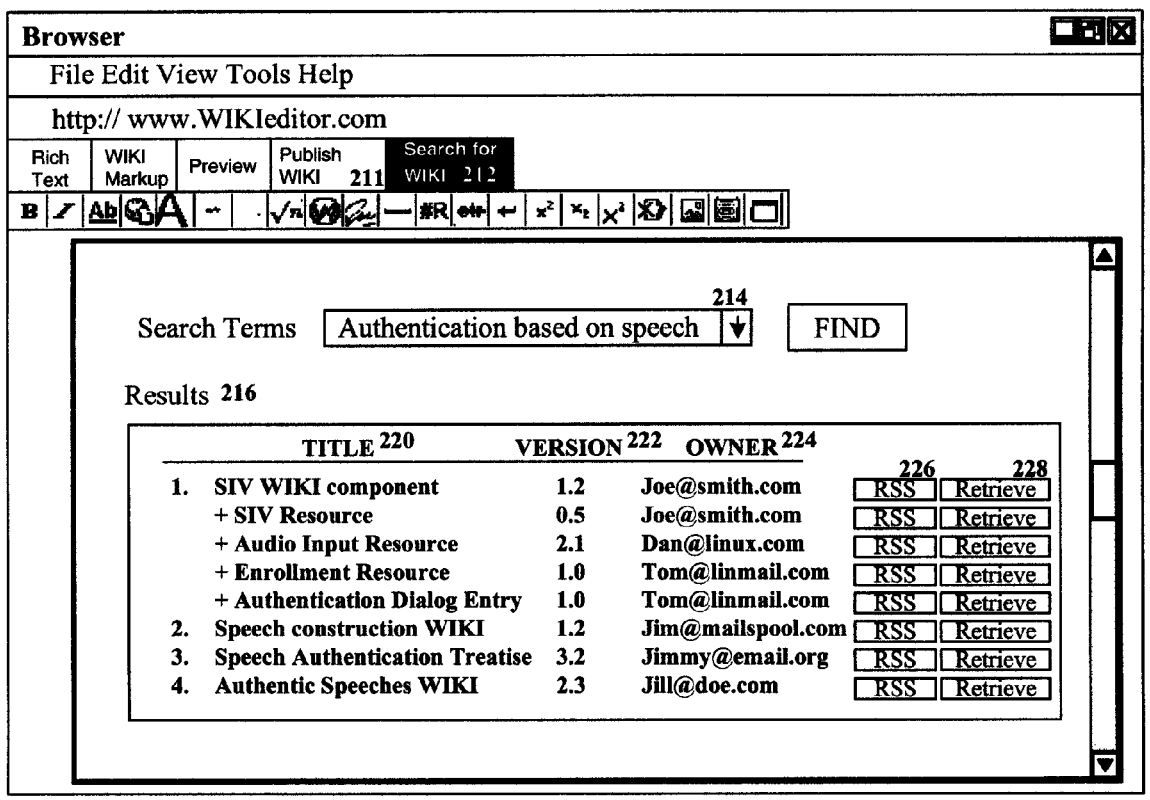
FIG. 2 shows a WIKI editing interface that includes options to publish a WIKI and to search for WIKI content in accordance with an embodiment of the inventive arrangements disclosed herein.

FIG. 2 shows a WIKI editing interface 210 that includes options to publish a WIKI 211 and to search for WIKI content 212 in accordance with an embodiment of the inventive arrangements disclosed herein. The publication option 211 and the searching option 212 rely upon an infrastructure where WIKI data is published to a BLOG server which organizes the WIKI data in BLOG for WIKI publications. Thus, the interface 210 can be an interface of WIKI server 110 or 120 as shown in system 100. It should be appreciated that details of interface 210 are for illustrative purposes only and that derivatives in element arrangement, included tools, interface modality, and the like are contemplated.

The interface 210 can be rendered in a standard browser which is able to render pages served by a WIKI server. A special WIKI application is shown, which is transparently integrated to a BLOG server, and which stores BLOG for WIKI publications. The publish WIKI 211 tab can permit the rendered WIKI page to function as a BLOG editor for BLOG for WIKI publications. In one embodiment, a user can also view, edit and search BLOG for WIKI publications through a BLOG interface (not shown) served by a BLOG server.

A second special WIKI application is associated with the search for WIKI tab 212 that is configured to permit a user to search BLOG entries associated with WIKIs (e.g., BLOG for WIKI publications) to choose entries of interest. More specifically, the search 211 application can include a criteria specification element 214 which permits a user to enter search terms. These terms are compared against indexed keywords. The indexed keywords can be constructed by analyzing metadata associated with WIKI for BLOG publications and/or by analyzing content of WIKI for BLOG publications. In system 100, resource searching engine 116 can perform tasks associated with querying a data store for entries that satisfy the criteria entered in element 214.

Upon pressing a find button, a set of results 216 can be presented. These results can include a title 220 of a matching entry, version information 222, ownership information 224, and other metadata associated with a WIKI. For example, user criteria of "authentication based on speech" can produce results 216 including "1. SIV (speech identification and verification) WIKI," a "2. Speech Construction WIKI," "3. Speech Authentication treatise," and "4. Authentic Speeches WIKI" as shown in FIG. 2. Each returned WIKI result can be further decomposed into sub-elements, as shown by the sub-elements of "SIV Resource," "Audio Input Resource," "Enrollment Resource," and "Authentication Dialog Entry," which each correspond to the "SIV WIKI component."

Sub-elements are in accordance with an underlying organizational structure which can conform to an APP based protocol. Thus, the BLOG for WIKI 160 publication of system 100 would include sub-elements of literature and music. The music sub-element would have further sub-elements of rock, and classical. The rock sub-element would have sub-elements of artist 1 and artist N. Appreciatively, organizing WIKI applications in the specified structure permits fine-grained control of WIKI entries and resources which lends itself to software re-use and sharing. User facing tools, such as interface 210, permits advantages of the organized structure to be exploited by WIKI application developers.

Each returned WIKI result 216 item can be associated with one or more user selectable actions. One selectable action can be to subscribe to an RSS 226 feed associated with an item. Pressing the RSS button 226 corresponding to the SIV resource, for example, can ensure a user is provided with notices whenever the SIV resource is modified. Another selectable action is a retrieve 228 action. This action can cause the selected item to be retrieved. Retrieving an item can load syntax for that item into a WIKI editor. Thus, retrieving 228 the SIV WIKI component and then pressing the WIKI markup tab can result in a presentation of editable WIKI markup for the SIV WIKI component. The actions 226, 228 are not intended to be exhaustive and other actions are contemplated. For example, actions to edit/view metadata, to upload WIKI server data for publication in a specified WIKI server, to solicit an owner for permission to modify a secure or proprietary WIKI item, and other actions are to be considered within the scope of the present invention.

Figure 3:
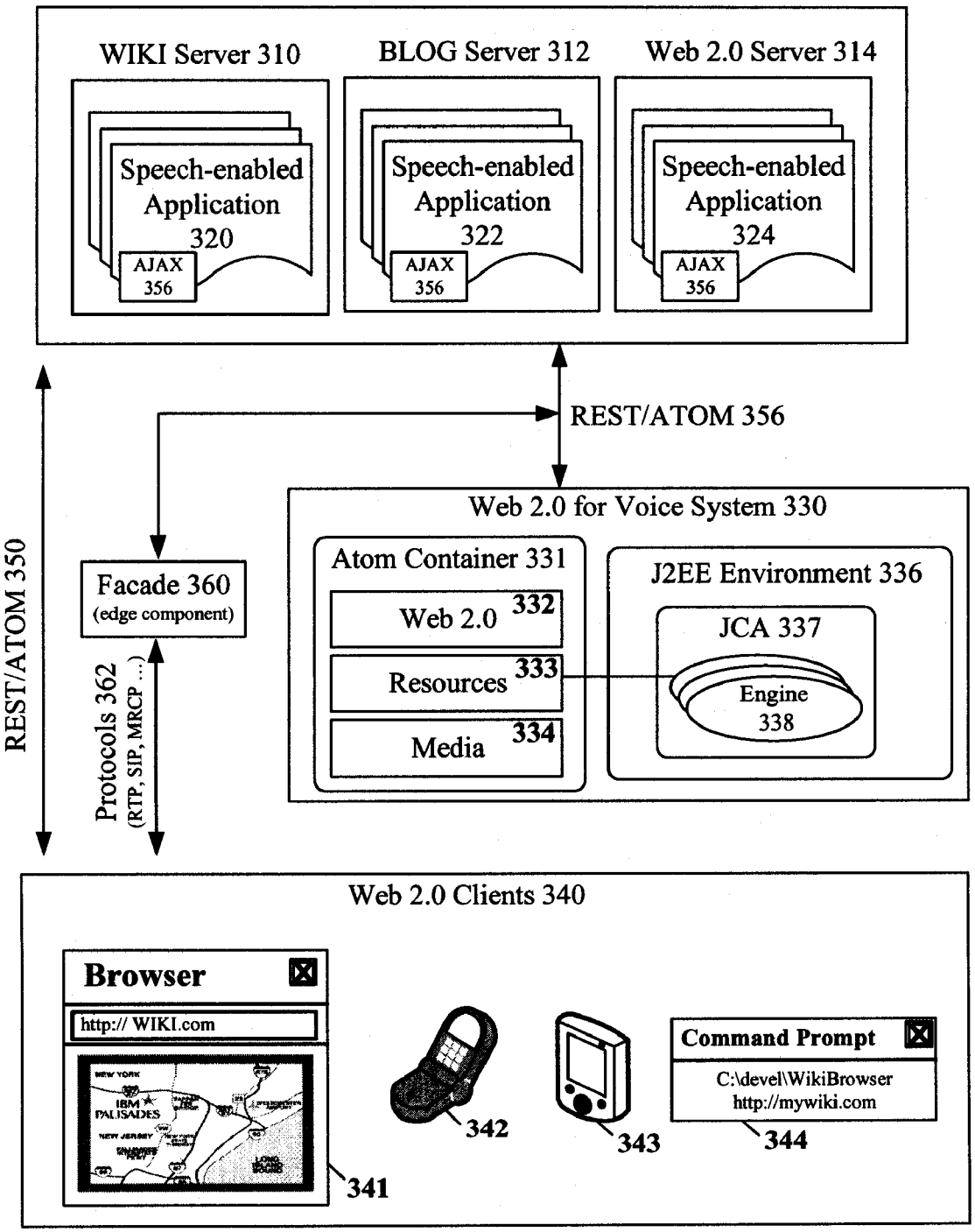
FIG. 3 is a schematic diagram of a system for a Web 2.0 for voice system in accordance with an embodiment of the inventive arrangements disclosed herein.

FIG. 3 is a schematic diagram of a system 300 for a Web 2.0 for voice system 330 in accordance with an embodiment of the inventive arrangements disclosed herein. System 300 can be one contemplated underlying infrastructure for system 100.

In system 300, Web 2.0 clients 340 can communicate with Web 2.0 servers 310-314 utilizing a REST/ATOM 350 protocol. The Web 2.0 servers 310-314 can serve one or more speech-enabled applications 320-324, where speech resources are provided by a Web 2.0 for Voice System 330. One or more of the speech-enabled applications 320-324 can include AJAX 356 or other JavaScript code. In one embodiment, the AJAX 356 code can be automatically converted from WIKI or other syntax by a transformer of a server 310-314. The servers 310-314 can communicate with each other using a REST/ATOM protocol. For example, the WIKI server 310 can publish WIKI data to BLOG server 312, which organizes and indexes the WIKI data in an APP compliant format. Special WIKI applications (320) can search entries managed by the BLOG server 312, as described in FIGS. 1 and 2.

Communications between the Web 2.0 servers 310-314 and system 330 can be in accordance with REST/ATOM 356 protocols. Each speech-enabled application 320-324 can be associated with an Atom container 331, which specifies Web 2.0 items 332, resources 333, and media 334. One or more resource 333 can correspond to a speech engine 338. REST/ATOM protocols 350, 356 can include HyperText Transfer Protocol (HTTP) and similar protocols that are RESTful by nature as well as APP or other protocols that are specifically designed to conform to REST principles.

The Web 2.0 clients 340 can be any client capable of interfacing with a Web 2.0 server 310-314. For example, the clients 340 can include a Web or voice browser 341 as well as any other type of interface 344, which executes upon a computing device. The computing device can include a mobile telephone 342, a mobile computer 343, a laptop, a media player, a desktop computer, a two-way radio, a line-based phone, and the like. There are no assumptions regarding the client 340 other than an ability to communicate with a Web 2.0 server 310-314 using Web 2.0 conventions.

The Web 2.0 servers 310-314 can be any server that provides Web 2.0 content to clients 340 and that optionally provides speech processing capabilities through the Web 2.0 for voice system 330. The Web 2.0 servers can include a WIKI server 310, a BLOG server 312, a MASHUP server, a FOLKSONOMY server, a social networking server, and any other Web 2.0 server 314.

The Web 2.0 for voice system 330 can utilize Web 2.0 concepts to provide speech capabilities. A server-side interface is established between the voice system 330 and a set of Web 2.0 servers 310-314. Available speech resources can be introspected and discovered via introspection documents, which are one of the Web 2.0 items 332. Introspection can be in accordance with the APP specification or a similar protocol. The ability for dynamic configuration and installation is exposed to the servers 310-314 via the introspection document.

That is, access to Web 2.0 for voice system 330 can be through a Web 2.0 server that allows users (e.g., clients 340) to provide their own customizations/personalizations. Appreciably, use of the APP 356 opens the application interface to speech resources using Web 2.0, JAVA 2 ENTERPRISE EDITION (J2EE), WEBSPHERE APPLICATION SERVER (WAS), and other conventions rather than being restricted to protocols, such as media resource control protocol (MRCP), real time streaming protocol (RTSP), or real time protocol (RTP).

The Web 2.0 for Voice system 330 is an extremely flexible solution that permits users (of clients 340) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, VoiceXML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 338 can be provided from a J2EE environment 336, such as a WAS environment. This environment 336 can conform to a J2EE Connector Architecture (JCA).

In one embodiment, a set of additional facades 360 can be utilized on top of Web 2.0 protocols to provide additional interface and protocol 362 options (e.g., MRCP, RTSP, RTP, Session Initiation Protocol (SIP), etc.) to the Web 2.0 for voice system 330. Use of facades 360 can enable legacy access/use of the Web 2.0 for voice system 330. The facades 360 can be designed to segment the protocol 362 from underlying details so that characteristics of the facade do not bleed through to speech implementation details. Functions, such as the WAS 6.1 channel framework or a JCA container 337, can be used to plug-in a protocol, which is not native to the J2EE environment 336. The media component 334 of the container 331 can be used to handle media storage, delivery, and format conversions as necessary. Facades 360 can be used for asynchronous or synchronous protocols 362.

Figure 4:
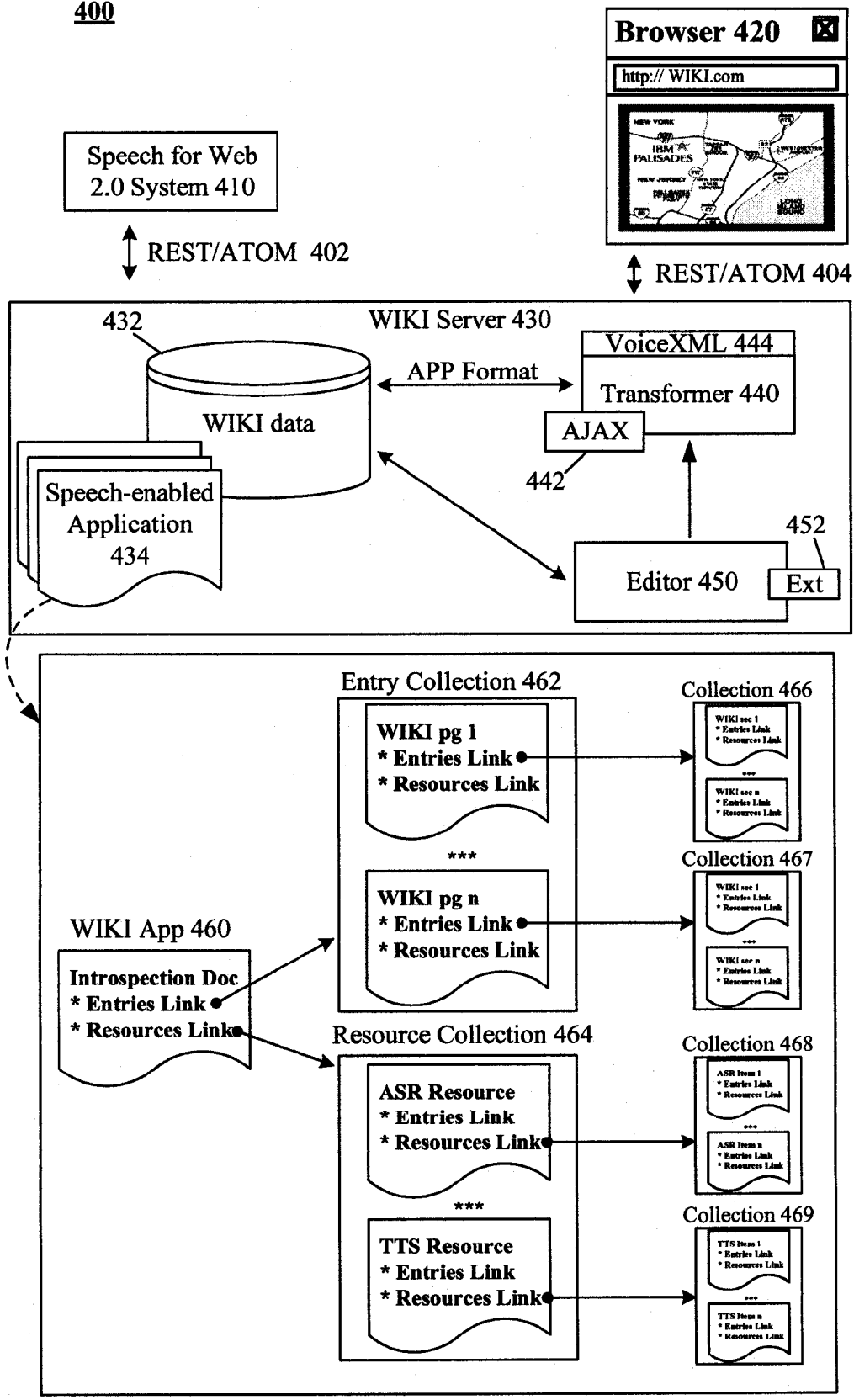
FIG. 4 is a schematic diagram illustrating a WIKI server configured to interact with a speech for Web 2.0 system in accordance with an embodiment of the inventive arrangements disclosed herein.

FIG. 4 is a schematic diagram 400 illustrating a WIKI server 430 configured to interact with a speech for Web 2.0 system 410 in accordance with an embodiment of the inventive arrangements disclosed herein. Although a WIKI server 430 is illustrated, server 430 can be any WEB 2.0 server including, but not limited to, a BLOG server, a MASHUP server, a FOLKSONOMY server, a social networking server, and the like.

In the system 400, a browser 420 can communicate with WIKI server 430 via a REST/ATOM 404 based protocol. The WIKI server 430 can communicate with system 410 via a REST/ATOM 402 based protocol.

The WIKI server 420 can include a data store 432 in which speech-enabled applications 434 and other server applications are stored. In one embodiment, the applications 434 can be written in a WIKI syntax contained in an APP format.

The contents of an application 434 can be accessed using editor 450. The editor 450 can be a standard WIKI editor having a voice plug-in or extensions 452. Modifications made to the application 434 via the editor 450 can be published to a BLOG server, where WIKI data is able to be stored as BLOG entries.

The transformer 440 can convert WIKI syntax into standard markup for browsers. In one embodiment, the transformer 440 can be an extension of a conventional transformer that supports HTML and XML. The extended transformer 440 can be enhanced to handle JavaScript, such as AJAX. For example, resource links of application 434 can be converted into AJAX functions by the transformer 440 having an AJAX plug-in 442. The transformer 440 can also include a VoiceXML plug-in 444, which generates VoiceXML markup for voice-only clients.

Each of the speech-enabled WIKI applications 434 can be organized in an APP based format, as shown by WIKI application 460. The application 460 includes an introspection document and a link to an entries collection 462 and a resource collection 464. Each of these collections 462 and 464 can be linked to other collections 466-469. For example, entry collection 462 can be a collection of WIKI pages, which are linked to WIKI page sections (collections 466-467). The resource collection 464 can include speech processing resources, which are linked to resource specifics (collection 468-469).

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for sharing and acquiring WIKI data comprising:
   utilizing a user interface of a WIKI editor of a WIKI server to create or modify a WIKI;
   saving the created or modified WIKI in a data store of the WIKI server;
   the WIKI server serving the created or modified WIKI of the data store from the WIKI server as at least one WIKI page;
   responsive to the creation or modification of the WIKI, the WIKI server automatically triggering a publication event to publish the WIKI;
   publishing WIKI data from the WIKI server to a BLOG server responsive to the publication event;
   creating a BLOG entry within a data store of the BLOG server that is separate from the data store of the WIKI server, wherein said BLOG is formatted in an ATOM PUBLISHING PROTOCOL (APP) compliant format, wherein the created BLOG entry includes a link to said at least one WIKI page;
   permitting at a resource searching engine of the WIKI server, searching of the BLOG entries associated with WIKI using user-specified criteria;
   returning at the WIKI server, search results that include WIKI data from the BLOG entries of the BLOG data store that match the user-specified criteria; and
   establishing at the BLOG server (Rich Site Summary) RSS feeds for the WIKI, wherein developers of WIKI content are able to subscribe to the RSS feeds of the BLOG server to receive update notifications via RSS updates whenever any changes are made to the at least one WIKI page, via the WIKI editor of the WIKI server.

2. The method of claim 1, wherein the permitting further comprises:
   permitting BLOG entries associated with WIKIs to be searched, by the WIKI server, using user-specified criteria, which match BLOG entry criteria associated with the WIKI data in the BLOG data store but that do not match criteria maintained for the WIKI data in the WIKI data store.

3. The method of claim 1, wherein the created BLOG entry includes a set of linked markup documents, said linked markup documents including en entry collection of documents and a resource collection of documents, wherein said linked markup documents are configured so that end-users are able to introspect, customize, replace, add, re-order, and remove at least a portion of the linked markup documents, wherein said linked markup documents include digitally encoded content specifying at least one WIKI page and metadata for the at least one WIKI page, wherein said metadata comprises at least two of a title of the WIKI page, a version of the WIKI page, a summary of the WIKI page, and an owner of the WIKI page, wherein said resource collection includes speech processing resources, which are linked to resource specifics.

4. The method of claim 1, wherein the WIKI data comprises metadata for a related WIKI page, said metadata comprising at least two of a title of the WIKI page, a version of the WIKI page, a summary of the WIKI page, and an owner of the WIKI page, wherein keywords automatically derived from said metadata are matched against the user-specified criteria when searching the BLOG entries.

5. The method of claim 3, wherein the user-specified criteria include criteria of the resource collection and include criteria for specific speech processing resources linked to the WIKI data, said speech processing resource including at least speech identification and verification resources, whether the WIKI was constructed using speech construction, and whether said WIKI data enables automatic speech recognition or text to speech resources.

6. The method of claim 1, wherein the user-specified criteria is not present in the data store used by the WIKI server.

7. The method of claim 1, wherein said steps of claim 1 are steps performed automatically by at least one machine in accordance with at least one computer program having a plurality of code sections that are executable by the at least one machine, said at least one computer program being stored in a machine readable medium.

8. A computer program product comprising a non-transitory computer usable storage medium having computer usable program embodied therewith, wherein the computer usable program code when executed on a computer causes the computer to:
   utilize a user interface of a WIKI editor of a WIKI server to create or modify a WIKI;

save the created or modified WIKI in a data store of the WIKI server;

serve the created or modified WIKI of the data store from the WIKI server as at least one WIKI page;

responsive to the creation or modification of the WIKI, automatically triggering a publication event to publish the WIKI;

publish WIKI data from the WIKI server to a BLOG server responsive to the publication event;

create a BLOG entry within a data store of the BLOG server that is separate from the data store of the WIKI server, wherein said BLOG is formatted in an ATOM PUBLISHING PROTOCOL (APP) compliant format, wherein the created BLOG entry includes a link to said at least one WIKI page;

permit at a resource searching engine of the WIKI server, searching of the BLOG entries associated with WIKIs using user-specified criteria;

return at the WIKI server, search results that include WIKI data from the BLOG entries of the BLOG data store that match the user-specified criteria; and establish at the BLOG server (Rich Site Summary) RSS feeds for the WIKI, wherein developers of WIKI content are able to subscribe to the RSS feeds of the BLOG server to receive update notifications via RSS updates whenever any changes are made to the at least one WIKI page, via the WIKI editor of the WIKI server.

9. The computer program product of claim 8, wherein the computer usable program code when executed on a computer causes the computer to:

permit BLOG entries associated with WIKIs to be searched, by the WIKI server, using user-specified criteria, which match BLOG entry criteria associated with the WIKI data in the BLOG data store but that do not match criteria maintained for the WIKI data in the WIKI data store.

10. The computer program product of claim 8, wherein the created BLOG entry includes a set of linked markup documents, said linked markup documents including en entry collection of documents and a resource collection of documents, wherein said linked markup documents are configured so that end-users are able to introspect, customize, replace, add, re-order, and remove at least a portion of the linked markup documents, wherein said linked markup documents include digitally encoded content specifying at least one WIKI page and metadata for the at least one WIKI page, wherein said metadata comprises at least two of a title of the WIKI page, a version of the WIKI page, a summary of the WIKI page, and an owner of the WIKI page, wherein said resource collection includes speech processing resources, which are linked to resource specifics.

11. The computer program product of claim 8, wherein the WIKI data comprises metadata for a related WIKI page, said metadata comprising at least two of a title of the WIKI page, a version of the WIKI page, a summary of the WIKI page, and an owner of the WIKI page, wherein keywords automatically derived from said metadata are matched against the user-specified criteria when searching the BLOG entries.

12. The computer program product of claim 10, wherein the user-specified criteria include criteria of the resource collection and include criteria for specific speech processing resources linked to the WIKI data, said speech processing resource including at least speech identification and verification resources, whether the WIKI was constructed using speech construction, and whether said WIKI data enables automatic speech recognition or text to speech resources.

13. The computer program product of claim 8, wherein the user-specified criteria is not present in the data store used by the WIKI server.

14. A system comprising hardware and software that is stored in a non-transitory storage medium, wherein the hardware is operable to execute the software causing the system to:

utilize a user interface of a WIKI editor of a WIKI server to create or modify a WIKI;

save the created or modified WIKI in a data store of the WIKI server;

serve the created or modified WIKI of the data store from the WIKI server as at least one WIKI page;

responsive to the creation or modification of the WIKI, automatically triggering a publication event to publish the WIKI;

publish WIKI data from the WIKI server to a BLOG server responsive to the publication event;

create a BLOG entry within a data store of the BLOG server that is separate from the data store of the WIKI server, wherein said BLOG is formatted in an ATOM PUBLISHING PROTOCOL (APP) compliant format, wherein the created BLOG entry includes a link to said at least one WIKI page;

permit at a resource searching engine of the WIKI server, searching of the BLOG entries associated with WIKIs using user-specified criteria;

return at the WIKI server, search results that include WIKI data from the BLOG entries of the BLOG data store that match the user-specified criteria; and establish at the BLOG server (Rich Site Summary) RSS feeds for the WIKI, wherein developers of WIKI content are able to subscribe to the RSS feeds of the BLOG server to receive update notifications via RSS updates whenever any changes are made to the at least one WIKI page, via the WIKI editor of the WIKI server.

15. The system of 14, wherein the software when executed by the hardware on the system causes the system to:

permit BLOG entries associated with WIKIs to be searched, by the WIKI server, using user-specified criteria, which match BLOG entry criteria associated with the WIKI data in the BLOG data store but that do not match criteria maintained for the WIKI data in the WIKI data store.

16. The system of 14, wherein the created BLOG entry includes a set of linked markup documents, said linked markup documents including en entry collection of documents and a resource collection of documents, wherein said linked markup documents are configured so that end-users are able to introspect, customize, replace, add, re-order, and remove at least a portion of the linked markup documents, wherein said linked markup documents include digitally encoded content specifying at least one WIKI page and metadata for the at least one WIKI page, wherein said metadata comprises at least two of a title of the WIKI page, a version of the WIKI page, a summary of the WIKI page, and an owner of the WIKI page, wherein said resource collection includes speech processing resources, which are linked to resource specifics.

17. The system of 14, wherein the WIKI data comprises metadata for a related WIKI page, said metadata comprising at least two of a title of the WIKI page, a version of the WIKI page, a summary of the WIKI page, and an owner of the WIKI page, wherein keywords automatically derived from said metadata are matched against the user-specified criteria when searching the BLOG entries.

18. The system of 16, wherein the user-specified criteria include criteria of the resource collection and include criteria for specific speech processing resources linked to the WIKI data, said speech processing resource including at least speech identification and verification resources, whether the WIKI was constructed using speech construction, and whether said WIKI data enables automatic speech recognition or text to speech resources.

19. The system of 14, wherein the user-specified criteria is not present in the data store used by the WIKI server.

* * * * *